Dec. 27, 1938.  J. H. MANN, JR  2,141,543
TIRE INFLATING DEVICE
Filed Feb. 4, 1936
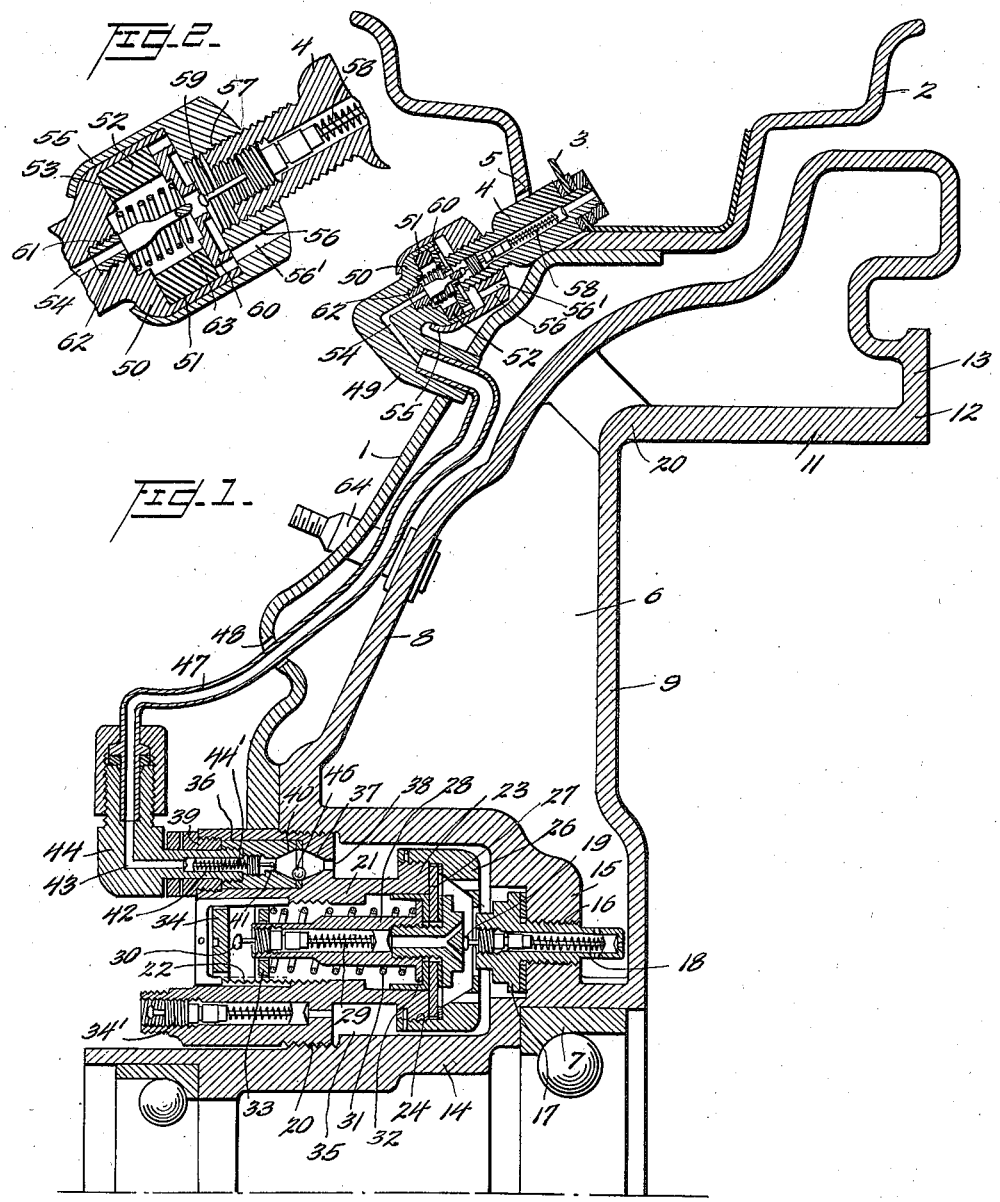
Inventor
J. H. Mann, Jr
By Robert S. Young
Attorney Patented Dec. 27, 1938

2,141,543

UNITED STATES PATENT OFFICE 2,141,543

TIRE INFLATING DEVICE

James Hervey Mann, Jr., St. Petersburg, Fla., assignor to Tire Pressure Control, Inc., a corporation of Florida Application February 4, 1936, Serial No. 62,363

4 Claims. (Cl. 152—418)

My invention relates to improvements in tire inflating devices.

The object of the invention is to provide a tank having the brake drum incorporated as an integral part thereof for each wheel and adapted to automatically supply air to the tire carried by the wheel, being so constructed as to maintain any predetermined pressure in the tire at all times.

Another object of the invention is to provide a device of this character in which the tire has a pressure therein less than the predetermined pressure for which the device is set, so that it may be placed on the wheel and connected thereto, and automatically supplied with air pressure up to the pre-determined pressure.

Another object of the invention is to provide a device so that it is impossible for the tire to be over-inflated regardless of the amount of air pressure of the supply tank, at the same time providing automatic means for shutting off the air to the tire in the event the tire blows or air is rapidly being exhausted from the tire, and thus prevents the exhaustion of all the air in the supply tank.

A further object of the invention is to provide a device of this character which can readily be made a part of the wheel, or an attachment therefor, and in no way disfigures the wheel, but gives it the same general appearance of the ordinary metal wheel now in use.

A still further object of the invention is to provide an apparatus of this character in which the air in the tire and the tank may be replenished from the outside, and the air in the tank and the tire tested independently of each other.

A still further object of the invention is to provide automatic means to prevent the escape of air from the tire, in the event the air pressure in the tank or control should for any reason suddenly fall below that of the tire.

A still further object of the invention is to provide a simple, cheap and effective structure to accomplish the desired results, having certain details of structure and combination of parts hereinafter more fully set forth.

In the accompanying drawing:

Figure 1 is a vertical sectional view of a wheel and brake drum forming the air tank and with my invention applied thereto;

Figure 2 is a sectional view of the valve stem connecting member in the act of being connected to the valve stem.

This invention is an improvement over my application filed August 7, 1935, Serial No. 35,172, to which reference will be hereinafter made.

Referring now to the drawing, 1 represents the disk wheel of any well known form, carrying at its outer edge the rim 2, upon which is mounted the tire 3, which carries the valve stem 4 and is removable through an opening 5, as clearly shown on the drawing. This is only a conventional form of wheel and rim as my invention may be used on any style of wheel. The high pressure tank 6 is of circular form so as to surround the hub 7 mounted on the axle and secured to the wheel in any desired manner. The outer wall 8 of the tank has a contour closely following that of the wheel and rim, while its inner wall 9 is straight and turned laterally at 20, forming the circular brake drum 11, so that the tank serves a two-fold purpose. The inner edge of the brake drum is turned laterally at 12, and forms the wall 13 connected to the outer wall of the tank, as clearly shown. The exact contour may be changed, but the circular brake drum must be maintained.

The outer wall of the tank is provided with an inwardly depressed cylindrical portion 14, having a closed inner end 15, provided with a screw-threaded opening 16, in which is screwed the member 17, carrying the Schrader type valve 18, the valve stem 19 extending in beyond the end of the member 17. The cylindrical member 14 is screw-threaded at its outer end, as indicated at 20, and into which is screwed the control carrying member 21. This member 21 has a bore therethrough, the outer end of which is internally threaded at 22. The inner end of the member is provided with an outwardly extending flange 23, externally threaded at 24, and upon which is threaded the member 26, which clamps the diaphragm 27 to the flange. The inner portion of the diaphragm carries a longitudinally movable member 28 arranged in the bore of the member 21. This member 28 is of a hollow form, and having arranged in its inner end the Schrader type valve 29, the valve stem 30 of which extends beyond the member 28.

Surrounding the member 28 is a coil spring 31, its inner end engaging a flange 32 carried by the member 28, and the outer end of this member engaging an adjustable nut 33 screwed into the threads 22 of the member 21, so that the tension of the spring on the diaphragm may be varied for determining the air pressure in the tire, as will be hereinafter described. The specific construction of this adjusting means is fully shown and described in my application, as heretofore set forth. Screwed within the member 21 in the threads 22, is a plug 34, which is engaged by the valve stem 30 to open the Schrader type valve 29, as will be later fully described.

The member 21 is provided with a Schrader type valve 34', and has its inner end communicating with the space 35 surrounding the member 21, so that air may be supplied to the tire and air pressure in the tire tested at any time without disconnecting the device from the tire. The member 21 is also provided with a bore 36, in which is arranged a valve for controlling the air pressure to and from the tire. The inner end of the bore is tapered, as at 37, and forms a valve seat having an opening at 38, communicating with the space 35. Within said bore 36 is a member 39 having a tapered valve seat 40 arranged opposite the valve seat 37, communicating with the opening 41, which communicates with the passage 42, and in turn communicates with the passage 43 in the elbow coupling 44. Within the passage 43 is a spring pressed plunger 44', the inner end of which extends slightly through the opening 41, normally preventing the ball valve 46 from seating on the seat 40, and closing the opening 41, the purpose of which will be later described.

The coupling 44 has a pipe 47 coupled thereto which extends through the opening 48 in the disk wheel 1 which extends outwardly and is connected to the coupling 49 carried by the wheel. This coupling has an enlarged outer end 50, and an annular depression 51 in its outer face, which is provided with a compressible rubber packing 52 and spring 63 having control openings 53 communicating with the passage 54 in the coupling 49. Loosely mounted on the enlarged portion 50 of the coupling is a sleeve 55 free to rotate and having its outer end thickened inwardly at 56 to extend over the depression of the coupling. This enlarged portion is provided with a threaded opening 57 adapted to receive the valve stem 4 of the tire 3. The valve stem is provided with the usual Schrader type valve 58, and the valve rod 59 extending flush or a slight distance beyond the valve stem, as is the case in all Schrader type valves. Resting against the rubber packing 52 and spring 63 is a brass pad 60 having a central opening communicating with the opening 53 in the rubber packing and adapted to be engaged by the valve stem, as will be later described.

The passage 54 of the coupling 49 is enlarged, as indicated at 61, and is threaded, and into which is screwed the member 62, which is of hollow form and communicates with the passage 53 in the rubber packing. The outer end of the member 62 is solid, as at 63, and extends through the packing and brass pad 60, and is adapted to engage the valve rod 59, when the coupling is fully connected to the valve stem.

By the structure shown in Figure 2 of the drawing, it will be seen that the sleeve 55 is screwed upon the valve stem 4, and as it is screwed up on the valve stem the same will engage the brass pad 60 and upon the continued screwing upon the valve stem the rubber packing 52 is compressed, thus forming an air tight connection. As it is further screwed upon the valve stem the solid end 63 of the member 62 engages the valve rod 59, and opens the valve giving a free passage of air to and from the tire through the connection 49, pipe 47, connection 44 past the valve 46 with the air space 35 for supplying the air to the tire.

In operation, the tank 6 is filled with air through the Schrader type valve 64, to any desired pressure, and preferably pretty high, so as to have sufficient air in reserve to keep the tire wholly inflated for a considerable length of time as well as to inflate any under-inflated tires in the event it is necessary to change a tire. The air pressure in the space 35 is the same as that of the tire (say 35 pounds) and equalizes itself on both faces of the diaphragm with the aid of the spring, so that the parts are in the position shown in the drawing. The air pressure being determined by the adjusting nut 33, which increases or decreases the pressure of the spring on the flange 32 of the member, whereby the end thereof is held in a certain position, when the predetermined air pressure is in the chamber 35, so that the valve rod is not engaged by the end of the member 28 carried by the diaphragm. Should the air in the tire fall below the pre-determined pressure of 35 pounds, relieving the pressure at the right of the diaphragm, the spring 35 will move the member 28 to the right and cause the end thereof to engage the valve rod 19 and open the Schrader type valve 18, allowing the air to pass from the tank 6 to the space 35. After the air pressure on the right of the diaphragm has reached 35 pounds, the pressure moves the diaphragm to the left and moves the end of the member 28 from the valve rod 19 and the valve will close, cutting off the air. If for any reason the valve 18 does not close and the pressure is built up in the space 35 in excess of the pre-determined pressure of 35 pounds, the diaphragm will be forced farther to the left, carrying the member 28 therewith, and causing the valve rod 30 to engage the nut or member 34, opening the Schrader type valve 29 and allowing the excess pressure in the space 35 to escape to the atmosphere, so that the tire will not be over inflated.

Should the tire blow, or the air leak rapidly therefrom, the air pressure in the space 35 would rush into the valve chamber and cause the ball valve 46 to seat itself on the valve seat 40 against the tension of the spring pressed rod 44', and prevent the rush of air through the space 35 to exhaust the air from the high pressure tank. The coupling may then be removed from the valve stem 4 and another tire placed on the wheel or rim and connected up, as heretofore described. Tires carried as spares invariably loose pressure and, if the pressure in the tire was below 35 pounds under ordinary conditions, the ball valve 46 would remain seated on the seat 40, and no air would pass to the tire so that you would have an under inflated tire and the pressure could not be built up. However, due to the pressure of the spring plunger or rod 44' on the valve 46, the valve will be opened against the predetermined air pressure of 35 pounds. For instance, the spring pressure on the valve 46 is 20 pounds, the spare tire has 15 or more pounds pressure, the combined pressure being 35 pounds or more, so that the valve 46 would be unseated and the tire supplied with the predetermined air pressure of 35 pounds. If for any reason the air pressure in the space 35 should suddenly fall below the predetermined 35 pounds, the ball valve 46 would be moved to the right seating itself on the seat 37, closing the opening 38 and the air in the tire would not be exhausted so that the tire could not be deflated. Such a circumstance might arise through the leakage past some of the valves or the tanks and air space.

My invention as shown is designed to meet with all emergencies encountered on the road so that tires may be changed and replenished with the predetermined air pressure, and the tires at all times maintaining the desired pressure. It also prevents the overinflation of the tire and provides means whereby the tire pressure and the tank pressure may be obtained with the ordinary guage without disconnecting any of the parts.

The sleeve 55 has its thickened portion 56 provided with an opening or port 56' which allows the rapid escape of air from the coupling just as the valve stem 4 breaks its seal with the pad 60. This rapid escape of air causes the ball valve 46 to operate, the same as when the tire blows.

While I have described the valves 29, 34', 58 and 64 as being of the Schrader valve type, it is for the purpose of a clear understanding of the invention by the ordinary layman. These valves may be of any desired make, automatically closing by spring and air pressure.

In the use of the word automatic I means self-moving and regulating.

What I claim is:

1. An automatic inflating device, comprising a wheel and its tire, a high pressure tank carried by the wheel, a pipe connecting the tank and tire, means carried by the tank for maintaining a predetermined pressure in the tire, a valve between the tank and pipe adapted to be seated by the rush of air through the pipe from the tire when the air pressure in the tank falls below the predetermined tire pressure, and closed against spring tension when the air in the tire rapidly exhausts whereby an under-inflated tire may be placed on the rim and the combined pressure thereof and the spring tension will unseat the valve to allow the predetermined pressure to enter the tire through the pipe.

2. An automatic tire inflating device, comprising a wheel and its tire, a high pressure tank carried by the wheel, a pipe connecting the tank and the tire, means carried by the tank for maintaining a predetermined pressure in the tire through the pipe, a ball valve between the tank and the pipe adapted to be seated by the rush of air from the tire through the pipe when the pressure in the tank falls below the predetermined tire pressure, and closed against spring tension when the air in the tire rapidly exhausts whereby an under-inflated tire may be placed on the rim and the combined air pressure and spring tension will unseat the valve to allow the predetermined pressure to enter the tire.

3. An automatic inflating device, comprising a wheel and its tire, a high pressure tank carried by the wheel, a pipe connecting the tank and tire, means carried by said pipe for opening the tire valve and holding it open, means carried by the tank for maintaining a predetermined pressure in the tire, a valve between the tank and pipe adapted to be seated by the rush of air through the pipe from the tire when the air pressure in the tank falls below the predetermined tire pressure, and closed against spring tension when the air in the tire rapidly exhausts whereby an under-inflated tire may be placed on the rim and the combined pressure thereof and the spring tension will unseat the valve to allow the predetermined pressure to enter the tire through the pipe.

4. An automatic tire inflating device, comprising a wheel and its tire, a high pressure tank carried by the wheel, a pipe connecting the tank and the tire, means carried by said pipe for opening the tire valve and holding it open, means carried by the tank for maintaining a predetermined pressure in the tire through the pipe, a ball valve between the tank and the pipe adapted to be seated by the rush of air from the tire through the pipe when the pressure in the tank falls below the predetermined tire pressure, and closed against spring tension when the air in the tire rapidly exhausts whereby an under-inflated tire may be placed on the rim and the combined air pressure and spring tension will unseat the valve to allow the predetermined pressure to enter the tire.

J. HERVEY MANN, Jr.